US010477664B1

(12) United States Patent
Hudgins et al.

(10) Patent No.: US 10,477,664 B1
(45) Date of Patent: Nov. 12, 2019

(54) METHOD AND DEVICE FOR GENERATING ELECTROMAGNETIC RADIATION BY MEANS OF A LASER-PRODUCED PLASMA

(71) Applicant: ETH Zürich, Zürich (CH)

(72) Inventors: Duane Edward Hudgins, Zürich (CH); Reza Shokrollah Abhari, Zürich (CH)

(73) Assignee: ETH ZÜRICH, Zürich (CH)

( * ) Notice: Subject to any disclaimer, the term of this patent is extended or adjusted under 35 U.S.C. 154(b) by 0 days.

(21) Appl. No.: 16/128,545

(22) Filed: Sep. 12, 2018

(51) Int. Cl.
*H05G 2/00* (2006.01)
*H01S 3/106* (2006.01)
*H01S 3/11* (2006.01)

(52) U.S. Cl.
CPC ............ *H05G 2/008* (2013.01); *H01S 3/106* (2013.01); *H01S 3/1106* (2013.01)

(58) Field of Classification Search
CPC ........ H05G 2/008; H01S 3/1106; H01S 3/106
USPC .......................................... 250/493.1, 504 R
See application file for complete search history.

(56) References Cited

U.S. PATENT DOCUMENTS

2004/0108473 A1* 6/2004 Melnychuk ............ B82Y 10/00 250/504 R
2016/0073487 A1* 3/2016 Yanagida ............... H05G 2/006 250/504 R

* cited by examiner

*Primary Examiner* — Michael Maskell
(74) *Attorney, Agent, or Firm* — Soroker Agmon Nordman

(57) ABSTRACT

The invention relates to a method for generating electromagnetic radiation by a laser-produced plasma, wherein a target comprising a target material is provided, at least one pulse sequence is directed to said target, wherein the pulse sequence comprises at least three conditioning laser pulses, wherein time intervals between subsequent conditioning laser pulses are 200 ns or less, and a main laser pulse is directed to said target along a first axis, such that a radiation-emitting plasma is formed from at least a part of said target material. The invention further relates to a device for generating electromagnetic radiation by means of a laser-produced plasma comprising a dispensing device and at least one laser source, wherein the device is configured such that at least one pulse sequence comprising at least three conditioning laser pulses and a main laser pulse can be generated by the at least one laser source.

19 Claims, 12 Drawing Sheets a)

b)

a)

b)

METHOD AND DEVICE FOR GENERATING ELECTROMAGNETIC RADIATION BY MEANS OF A LASER-PRODUCED PLASMA

FIELD OF THE INVENTION

The invention relates to a method and a device for generating electromagnetic radiation, particularly high intensity radiation such as UV, extreme UV (EUV) or X-ray radiation, by means of a laser-produced radiating plasma.

BACKGROUND OF THE INVENTION

Devices for generating electromagnetic radiation by means of a laser-produced plasma, such as droplet-based laser-produced plasma (LPP) light sources are known from the prior art. These devices are capable of producing very bright point sources of light over an extremely broad range of wavelengths from X-ray to visible light depending upon the application. These high brightness point sources are used for example in the semiconductor industry as well as other manufacturing industries within scanning systems for detecting defects during the semiconductor manufacturing process. There is also a need for these sources in advanced high-resolution microscopes for studies of cell biology or additive manufacturing.

Droplet-based LPP light sources work by generating a high temperature plasma, particularly within a vacuum chamber. Therein, particularly, a droplet train of fuel or target material is generated within a droplet dispenser. A positioning system directs the droplet train through a laser focus. As the droplets align with the laser focus a high energy laser pulse irradiates the droplet, evaporating and ionizing a portion of the target material generating a high temperature plasma. This plasma acts as almost as a point source of radiation. The wavelength and brightness of the light source depends on the choice of fuel and the energy of the laser pulse. For the generation of extreme ultraviolet light (EUV) at 13.5 nm the target material is typically pure tin, lithium or xenon.

In these sources debris from the exploding droplet (often liquid metal) remains a challenge, since the liquid splashes coat optics and nearby instrumentation within the vacuum chamber, making long term source operation challenging.

The unevaporated portion of a droplet typically starts as a spherical shape that when subjected to a shock wave from the expanded plasma produces splash fragments of a predetermined size, wherein the fragment size distribution is highly dependent on droplet and laser parameters. The larger these splashes are, the more difficult it is to protect the source optics.

According to the prior art, the size of debris particles can be reduced by applying a single pre laser pulse to the target, thereby shaping the target prior to the main laser pulse (US 2017/0027047 A1, U.S. Pat. No. 8,164,076 B2, US 2006/0215712 A1, U.S. Pat. No. 9,820,368 B2, U.S. Pat. No. 7,928,416 B2, U.S. Pat. No. 7,239,686 B2).

However, these pre-pulsing methods known from the prior art have the disadvantage that only a limited repertoire of target shapes which are sub-optimal in terms of debris mitigation, conversion efficiency and/or stability of operation can be obtained.

SUMMARY

Therefore, it is an objective of the present invention to provide a method and device for generating electromagnetic radiation by means of a laser-produced plasma which is improved in respect of the drawbacks of the prior art.

It is a further objective of the present invention to provide a method and device for generating electromagnetic radiation by means of a laser-produced plasma with improved debris mitigation.

It is a further objective of the present invention to provide a method and device for generating electromagnetic radiation by means of a laser-produced plasma resulting in debris particles of reduced size.

It is a further objective of the present invention to provide a method and device for generating electromagnetic radiation by means of a laser-produced plasma with improved stability of operation.

It is a further objective of the present invention to provide a method and device for generating electromagnetic radiation by means of a laser-produced plasma with improved conversion efficiency.

These objectives are attained by the subject matter of the independent claims 1 and 17. Advantageous embodiments of the invention are specified in the dependent claims and described hereafter.

The invention described hereafter includes all technically possible combinations between aspects and embodiments.

A first aspect of the invention relates to a method for generating electromagnetic radiation by means of a laser-produced plasma, wherein a target, particularly a droplet, comprising a target material is provided, particularly in a vacuum chamber, and wherein at least one pulse sequence is directed to the target, wherein the pulse sequence comprises at least three conditioning laser pulses, wherein time intervals, particularly each time interval, between subsequent conditioning laser pulses within the pulse sequence are 200 ns or less, and wherein a main laser pulse is directed to the target along a first axis, such that a radiation-emitting plasma is formed from at least a part of the target material.

Therein, in particular, the conditioning pulses and the main pulse may be provided along a common axis or at an off-axis angle to each other.

The pulse sequence may be directed at the target prior to the main laser pulse (pre pulse sequence) or after the main laser pulse (post pulse sequence).

A single pre pulse sequence or several pre pulse sequences may be applied to the target prior to the main laser pulse. Likewise, a single post pulse sequence or several post pulse sequences may be applied to the target. It is also possible within the scope of this invention to combine a single pre pulse sequence with a single post pulse sequence or several post pulse sequences, and several pre pulse sequences may be combined with a single post pulse sequence or several post pulse sequences.

In certain embodiments, two or more pulse sequences are directed to the target. Therein, subsequent pulse sequences may be separated by any time interval within the scope of the invention. In particular, such time intervals may be at least 200 ns long, for example 200 ns, 500 ns, 1 μs, 1.5 μs or 2 μs.

Since the target material is typically moving (i.e. a droplet of target material moving from a droplet dispensing device through a vacuum chamber), the at least one pulse sequence and the main laser pulse may irradiate different locations that the target aligns with during the time of the pulse sequence and the main laser pulse, respectively depending on the timing of the respective laser pulses, the velocity of the target, the spot diameters of the respective laser pulses and the size of the target. Likewise, in case a pre pulse sequence and a post pulse sequence is provided, the pre pulse sequence will typically irradiate a different location than the post pulse sequence. Of course, in case there are two or more pre pulse sequences and/or two or more post pulse sequences, individual pre pulse sequences and/or individual post pulse sequences may irradiate different locations depending on the timing of the pre and/or post pulse sequences.

The use of a pulse sequence has the advantage that improved target shapes resulting in especially small droplet particles and especially high conversion efficiencies can be generated from a pre-pulse sequence compared to a single pre-pulse. In addition the formation of cavitation bubbles in the target material is prevented or mitigated by using a pulse sequence. Furthermore, when applied after the main laser pulse, the pulse sequence results in an efficient deflection of debris particles from their path of movement, thereby protecting source optics.

The term ‘time interval’ as used herein describes the time between the peak (in other words the time point of maximum intensity) of a first conditioning laser pulse in the pulse sequence or respective pulse sequence and the peak (in other words the time point of maximum intensity) of a second conditioning laser pulse in the pulse sequence or respective pulse sequence subsequent to the first conditioning laser pulse. Therein, the second conditioning laser pulse is subsequent to the first conditioning laser pulse, meaning that there is no further conditioning laser pulse between the first conditioning laser pulse and the second conditioning laser pulse.

Time intervals between subsequent conditioning laser pulses within the same pulse sequence are 200 ns or less. Subsequent conditioning pulses of the same pulse sequence may immediately follow each other or overlap with each other on a time scale, meaning that the second conditioning laser pulse of two subsequent conditioning laser pulses may begin before the first conditioning laser pulse of the two subsequent conditioning laser pulses ends.

The main laser pulse is directed to the target, such that a radiation-emitting plasma is formed from at least a part of the target material. Therein, in particular, the target material is ionized by the main laser pulse.

In particular, the target material comprises near solid-density. For example, the target material may be a molten or liquefied metal, such as tin, lithium, xenon, gallium, indium or selenium, in particular tin or tin compounds, lithium or lithium compounds, liquefied xenon or xenon compounds, liquefied gallium, liquefied indium and/or selenium compounds or their alloys.

In particular, the shape of the target is changed and/or the target is deflected by means of the conditioning laser pulses of the pulse sequence.

In particular, the pulse sequence comprises three or more conditioning pulses such that quadratic or higher order influences on the target are possible.

In certain embodiments of the method, the time intervals between subsequent conditioning laser pulses, particularly in a respective pulse sequence, are 100 ns or less, particularly 10 ns or less, more particularly 5 ns or less.

In certain embodiments, the time intervals between subsequent conditioning laser pulses, particularly in a respective pulse sequence, are 150 ns or less, particularly 100 ns or less, more particularly 80 ns or less, even more particularly 60 ns or less, even more particularly 40 ns or less, even more particularly 20 ns or less, even more particularly 15 ns or less, even more particularly 10 ns or less, even more particularly 5 ns or less, most particularly 1 ns or less.

In certain embodiments, each of the conditioning laser pulses comprises a pulse duration of 999 ps or less. In other words, the conditioning laser pulses are picosecond laser pulses.

In certain embodiments, each of the conditioning laser pulses comprises a pulse duration of 800 ps or less, more particularly 600 ps or less, even more particularly 400 ps or less, even more particularly 200 ps or less, even more particularly 100 ps or less, even more particularly 80 ps or less, even more particularly 60 ps or less, even more particularly 50 ps or less, even more particularly 40 ps or less, even more particularly 30 ps or less, even more particularly 20 ps or less, even more particularly 10 ps or less, even more particularly 5 ps or less, even more particularly 1 ps or less, even more particularly 500 fs or less, even more particularly 200 fs or less, even more particularly 100 fs or less, even more particularly 50 fs or less, even more particularly 20 fs or less, most particularly 10 fs or less.

Picosecond laser pulses are especially efficient in shaping the target prior to the main laser pulse in order to reduce the size of debris particles with minimal cavitation and high conversion efficiency.

In particular, the pulse duration affects the depth of a cup-shape generated in the target by the at least one pre pulse sequence, resulting in especially small debris particles and especially high conversion efficiency.

In the scope of the present specification, conversion efficiency is defined as the proportion of the energy of the radiation emitted by the plasma to the energy of the main laser pulse.

According to certain embodiments of the method, the pulse sequence or a respective pulse sequence comprises at least 10 conditioning laser pulses, particularly at least 100 conditioning laser pulses, more particularly at least 1000 conditioning laser pulses, even more particularly at least 10000 conditioning laser pulses, even more particularly at least 100000 conditioning laser pulses, most particularly at least 500000 conditioning laser pulses.

In particular, the number of pulses in the pulse sequence affects the depth of a cup-shape generated in the target by the at least one pre pulse sequence, resulting in especially small debris particles and especially high conversion efficiency.

In certain embodiments, a time delay between the pulse sequence or a respective pulse sequence and the main laser pulse is 10 μs or less, particularly 5 μs or less, more particularly 2 μs or less.

Therein, the term ‘time delay’ is defined as the time between the peak (in other words the time point of maximum intensity) of the last conditioning laser pulse of the pulse sequence and the peak (in other words the time point of maximum intensity) of the main laser pulse in case the pulse sequence occurs prior to the main laser pulse, or the time between the peak of the main laser pulse and the peak of the first conditioning laser pulse of the pulse sequence in case the pulse sequence occurs after the main laser pulse. If two or more pulse sequences are provided prior to the main laser pulse (pre pulse sequences), the term time delay is defined as the time between the peak of the last conditioning laser pulse of the last pre pulse sequence and the peak of the main laser pulse. Likewise, if two or more pulse sequences are provided after the main laser pulse (post pulse sequences), the term time delay is defined as the time between the peak of the main laser pulse and the first conditioning laser pulse of the first post pulse sequence.

By adjusting the time delay, pre pulsing and post pulsing may be optimized to coordinate the at least one pre pulse sequence and the at least one post pulse sequence with the main laser pulse.

In certain embodiments, the pulse sequence or a respective pulse sequence comprises a sequence duration of at least 0.1 μs, particularly at least 0.2 μs, more particularly at least 0.5 μs, most particularly at least 1 μs.

Therein, the term sequence duration is defined as the time from the peak (in other words the time point of maximum intensity) of the first conditioning laser pulse of the pulse sequence or a respective pulse sequence to the peak (in other words the time point of maximum intensity) of the last conditioning laser pulse of the pulse sequence or the respective pulse sequence.

Advantageously, the sequence duration of the pulse sequence affects the depth of a cup-shape generated in the target by the at least one pre pulse sequence, resulting in especially small debris particles and especially high conversion efficiency.

According to certain embodiments, the pulse sequence or a respective pulse sequence comprises an envelope, particularly comprising at least one peak.

In certain embodiments, an envelope of the pulse sequence or a respective pulse sequence comprises at least two peaks, wherein particularly the peaks partially overlap on a time scale. In other words, the peaks are not distinctly separated on the time coordinate.

The term ‘envelope’ as used herein is defined as a curve touching or connecting a plurality of maxima of the conditioning laser pulses of the respective pulse sequence when the pulse sequence is plotted on a time vs. laser intensity diagram. Therein, the term “maxima” relates to the maximum laser intensity values of the individual conditioning laser pulses. The envelope may have the shape of any mathematical function. In particular, the envelope may resemble a Gaussian or Lorentzian function.

In relation to the envelope of the pulse sequence, the term ‘peak’ is defined as a local maximum of the envelope curve.

In certain embodiments, the pulse sequence or a respective pulse sequence comprises at least two different time intervals between subsequent conditioning laser pulses within the pulse sequence.

In certain embodiments, the conditioning laser pulses each comprise a pulse energy of at least 1 μJ.

In certain embodiments, the pulse sequence comprises a sequence energy of 20 μJ to 3 mJ, particularly 100 μJ to 3 mJ. Therein, the sequence energy is defined as the sum of pulse energies in a pulse sequence.

In certain embodiments, the at least one pulse sequence, particularly the conditioning laser pulses, is/are provided along the first axis, particularly directed to the target along the first axis. In other words, the conditioning laser pulses are provided on-axis (parallel) in respect of the main laser pulse.

This setup advantageously reduces the space used up by separate laser sources, thereby reducing the size of the light source. It also simplifies the alignment of the laser axes and reduces the cost of components.

Alternatively, according to certain embodiments, the pulse sequence, particularly the conditioning laser pulses, is/are provided along a second axis which is non-parallel to the first axis, particularly directed to the target along a second axis which is non-parallel to the first axis. In other words, the conditioning laser pulses are provided off-axis in respect of the main laser pulse.

In particular, this has the advantage that the optics can be optimized for each laser beam separately in terms of anti-reflective coatings, focal distance and focal spot size. Furthermore, a greater distance can be set between the irradiation zones of the at least one pre pulse sequence, the main laser pulse and/or the at least one post pulse sequence. In other words, a greater distance can be set between the locations where the target is irradiated by the separate laser beams.

In certain embodiments, the laser intensity of the conditioning laser pulses in the pulse sequence or in a respective pulse sequence are randomly determined.

This has the advantage that a laser system with limitations in terms of stability of pulse energy or time interval between pulses may be used, thereby reducing cost and complexity of the system.

In certain embodiments, the at least one pulse sequence comprises at least one pre pulse sequence which is directed to the target prior to the main laser pulse.

Such an at least one pre pulse sequence advantageously allows shaping the target prior to the main laser pulse, such that a thin, continuous film of target material is formed, resulting in small debris particles, minimal cavitation leading to higher stability and high conversion efficiency. In addition, the at least one pre pulse sequence improves the absorbance of the target material, in particular because the amount of target material exposed to the main laser pulse radiation will be larger and/or because the geometry of the target will change the plasma evolution leading to greater main laser pulse absorption relative to a spherical droplet target (inertial confinement of the plasma).

In certain embodiments, the shape of the target is changed by means of the at least one pre pulse sequence, particularly such that the target is expanded, more particularly along the first axis and/or perpendicular to the first axis. Therein, in particular, the target will expand and deform as it drifts from the axis of the at least one pre pulse sequence to the axis of the main laser pulse axis.

An expanded target, in particular as a result of the lack of cavitation, results in a thin film resulting in small debris particles.

In certain embodiments, a cavity is created in the target by means of the at least one pre pulse sequence, wherein particularly the main laser pulse is directed to an inside surface of the cavity.

Therein, the term cavity describes an opening within a cup-like shape formed by the target, and does not reference cavitation bubbles formed within the target.

Such a cavity has the advantage that the conversion efficiency is greatly improved.

According to certain embodiments, the cavity comprises a depth along the first axis and a width perpendicular to the first axis, wherein the ratio between the depth and the width is from 100:1 to 1:100, particularly from 5:1 to 1:5, more particularly 1:1.

In particular, the diameter of the at least one pre pulse laser spot influences the depth of the cavity.

In certain embodiments, the at least one pulse sequence comprises at least one post pulse sequence which is directed to the target after the main laser pulse.

The at least one post pulse sequence advantageously allows deflecting debris particles from their path of movement.

According to certain embodiments, at least a part of the target material, particularly at least one debris particle generated from the target material by means of the plasma, is deflected by means of the at least one post pulse sequence.

In certain embodiments, the at least one pulse sequence comprises at least one pre pulse sequence comprising at least three conditioning laser pulses and at least one post pulse sequence comprising at least three conditioning laser pulses, wherein time intervals, particularly each time interval, between subsequent conditioning laser pulses within the at least one pre pulse sequence and within the at least one post pulse sequence are 200 ns or less, and wherein the at least one pre pulse sequence is directed to the target prior to the main laser pulse, and wherein the at least one post pulse sequence is directed to the target after the main laser pulse.

Combining the at least one pre pulse sequence and the at least one post pulse sequence allows to mitigate debris to a minimum since debris particles are reduced in size by pre-shaping and the resulting small debris particles are deflected by the at least one post pulse sequence.

In certain embodiments, the target material comprises or consists of tin, lithium, xenon, gallium, indium or selenium, in particular tin or tin compounds, lithium or lithium compounds, liquefied xenon or xenon compounds, liquefied gallium, liquefied indium and/or selenium compounds or their alloys.

In certain embodiments, the conditioning laser pulses of the at least one pulse sequence comprise a wavelength of 100 nm to 12 μm.

A second aspect of the invention relates to a device for generating electromagnetic radiation by means of a laser-produced plasma, particularly by the method according to the first aspect of the invention, wherein the device comprises a dispensing device for providing a target comprising a target material, at least one laser source, wherein the device is configured such that at least one pulse sequence comprising at least three conditioning laser pulses and a main laser pulse can be generated by the at least one laser source, wherein time intervals, particularly each time interval, between subsequent conditioning laser pulses within the pulse sequence are 200 ns or less, and wherein the dispensing device and the at least one laser source are arranged such that the at least one pulse sequence can be directed to the target, and the main laser pulse can be directed to the target along a first axis, such that a radiation-emitting plasma is formed from at least a part of the target material.

In particular, the conditioning laser pulses may be directed to the target along the first axis or along a second axis, which is non-parallel to the first axis.

In certain embodiments, the device for generating electromagnetic radiation by means of a laser-produced plasma is a laser-produced plasma light source, particularly a droplet-based laser-produced plasma light source.

In certain embodiments, the device comprises a vacuum chamber, wherein the dispensing device is adapted to provide the target in the vacuum chamber. Providing the target in the vacuum chamber means that the target may be generated in the vacuum chamber, particularly by the dispensing device, or the target may be generated outside of the vacuum chamber, particularly by the dispensing device, and be moved into the vacuum chamber, particularly by the dispensing device.

According to certain embodiments, the at least one laser source comprises a conditioning laser source for generating the conditioning laser pulses of the pulse sequence or a respective pulse sequence and a main laser source for generating the main laser pulse.

Separate conditioning and main laser sources allow to use specially adapted lasers for pre and post pulsing and plasma generation, which reduces costs and complexity of the device.

In certain embodiments, the device comprises a synchronization unit for adjusting a time delay between the at least one pulse sequence and the main laser pulse. In addition, in case two or more pulse sequences are provided, the synchronization unit may be configured to control the timing of the pulse sequences.

In certain embodiments, the at least one laser source comprises an electro optical modulator or an acousto optical modulator for changing the laser intensity of the at least one laser source or the conditioning laser source, such that the at least one pulse sequence can be generated.

In certain embodiments, the at least one laser source comprises a mode-locked laser oscillator, particularly a Q-switched mode-locked laser oscillator for generating the at least one pulse sequence.

This laser oscillator provides picosecond pulses in an especially cost-effective manner.

In certain embodiments, the device comprises an amplifier stage for amplifying the at least one laser pulse sequence.

In certain embodiments, the at least one laser source comprises a pulsed diode laser or a fiber laser.

BRIEF DESCRIPTION OF THE DRAWINGS

The present invention is now to be explained more closely by means of examples with reference to the attached drawings, which is meant to elucidate the invention without limiting its scope.

DETAILED DESCRIPTION

Figure 1:
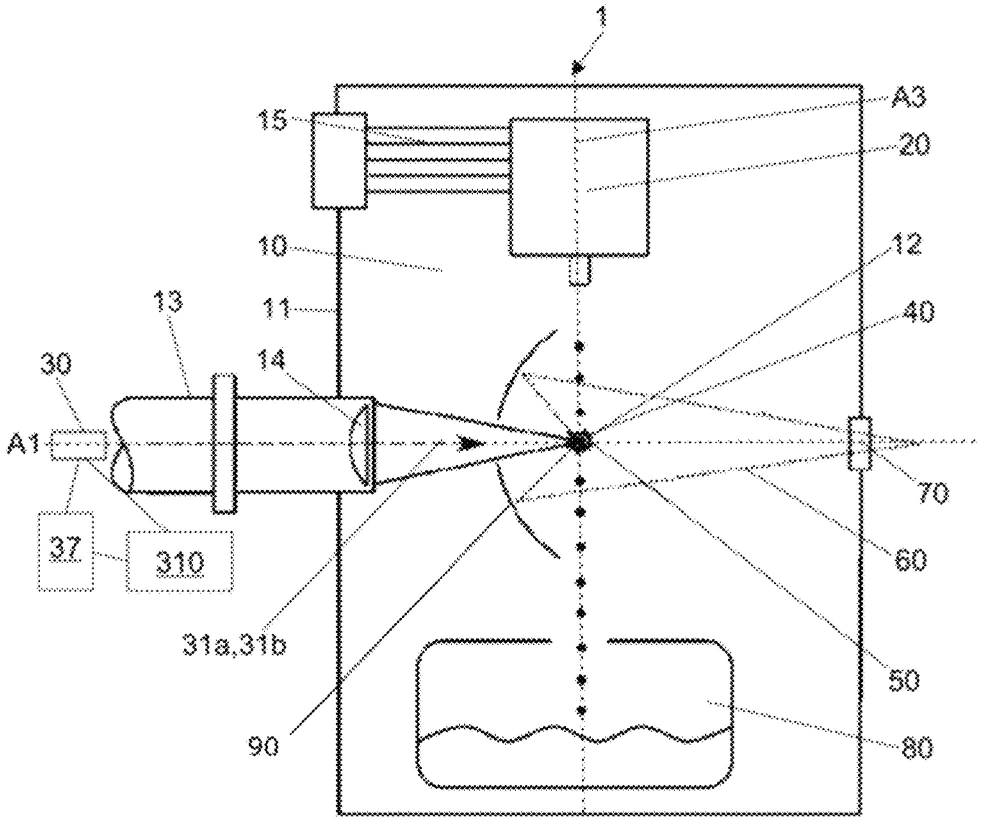
FIG. 1 schematically shows a first embodiment of a device for generating electromagnetic radiation according to the present invention comprising a single laser source.

The device 1 for generating radiation shown in FIG. 1-4 is a droplet based laser-produced plasma light source (LPP light source), for example for the generation of extreme ultraviolet light (EUV).

As depicted in FIG. 1-4, the device 1 comprises a casing 11 encompassing a vacuum chamber 10, a dispensing device 20, and at least one laser source 30.

The dispensing device 20 is supported by a positioning system 15 (shown in FIGS. 1 and 2) and configured to dispense a target 40, particularly a droplet, of a target material or fuel material (i.e. molten tin in case of an EUV light source) in the vacuum chamber 10, wherein the target 40 travels through the vacuum chamber 10 along a third axis A3 and is irradiated by a laser beam 31 (or main laser beam 31*b*) generated by the laser source 30. The laser beam 31 ionizes the target material of the target 40 at an irradiation site 12 in the vacuum chamber 10, thereby generating a plasma 50, which emits radiation 60, i.e. extreme UV (EUV) light. For example, if molten tin is used as target material, the center wavelength of the generated EUV light may be 13.5 nm.

Figure 2:
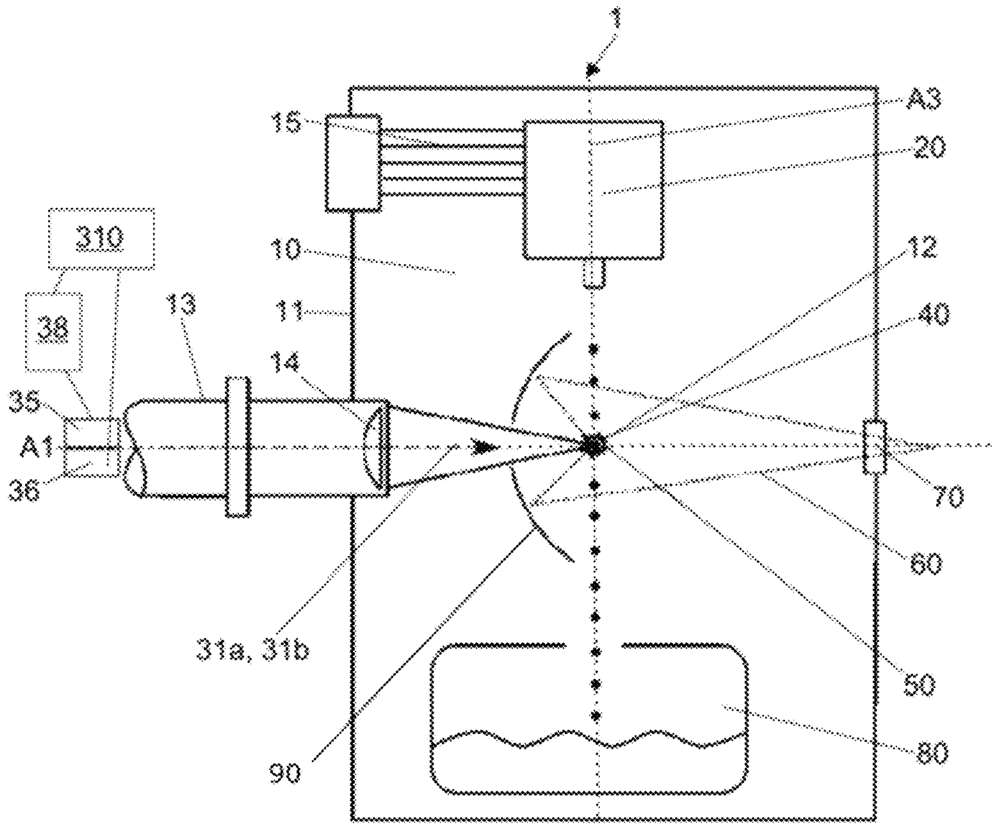
FIG. 2 schematically shows a second embodiment of a device for generating electromagnetic radiation according to the present invention comprising separate conditioning and main laser sources and a single beam directing and focusing optics.

If the target material is not fully converted into the plasma 50, the remaining target material is collected in a reservoir 80 of the device 1, and may be recycled to the dispensing device 20 (shown in FIGS. 1 and 2).

The radiation 60 leaves the vacuum chamber 10 through an intermediate focus 70 (for example a hole), is particularly collected by a collector 90 and used for different purposes such as scanning for defects on silicon wafers or high resolution microscopy.

The devices shown in FIG. 1-4 comprise collectors 90 for collecting and/or focusing the UV or X-ray radiation 60 is generated by the device 1, in particular comprising a mirror or a plurality of mirrors.

In the embodiment depicted in FIG. 1-2, the collector 90 for collecting and/or focusing the UV or X-ray radiation 60 is arranged according to a center axis collector having an intermediate focus 70. Center axis collectors typically work with near normal incidence angles. To increase the soft-X-ray reflectivity, periodic multi-layer structures are typically utilized in normal incidence collector setups.

Figure 3:
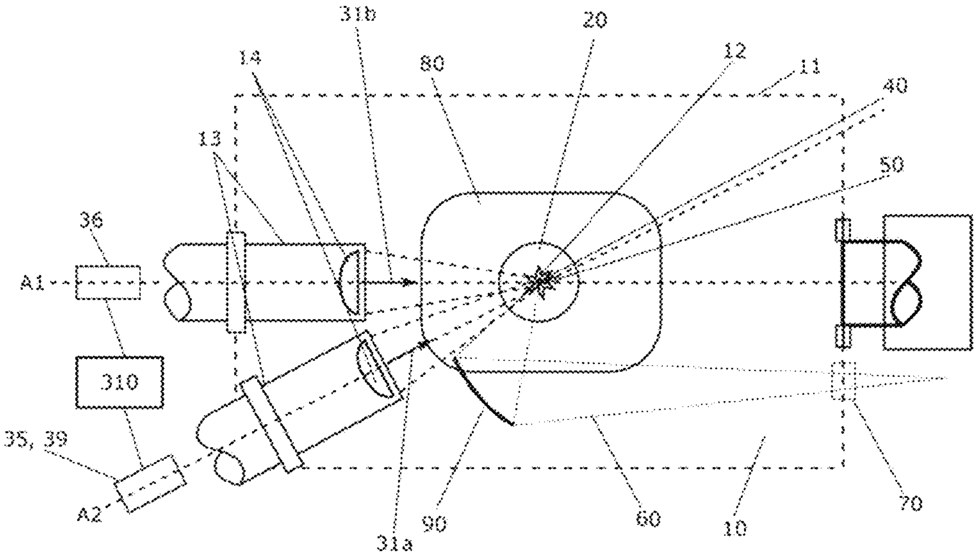
FIG. 3 schematically shows a simplified top view of a third embodiment of a device for generating electromagnetic radiation according to the present invention comprising a normal incidence collector and separate conditioning and main laser sources and two beam directing and focusing optics arranged at an angle.

In the embodiment depicted in FIG. 3, the collector 90 for collecting and/or focusing the UV, EUV or X-ray radiation 60 is arranged according to a normal incidence collector alignment having an intermediate focus 70. Normal incidence collectors typically work with near normal incidence angles. To increase the soft-X-ray reflectivity, periodic multi-layer structures are typically utilized in normal incidence collector setups.

FIG. 3 shows a setup with two separate laser sources for generating the main and conditioning laser pulses. However, the normal incidence collector displayed in FIG. 3 may also be combined with a setup having a single laser source, such as the one depicted in FIGS. 1 and 2.

Figure 4:
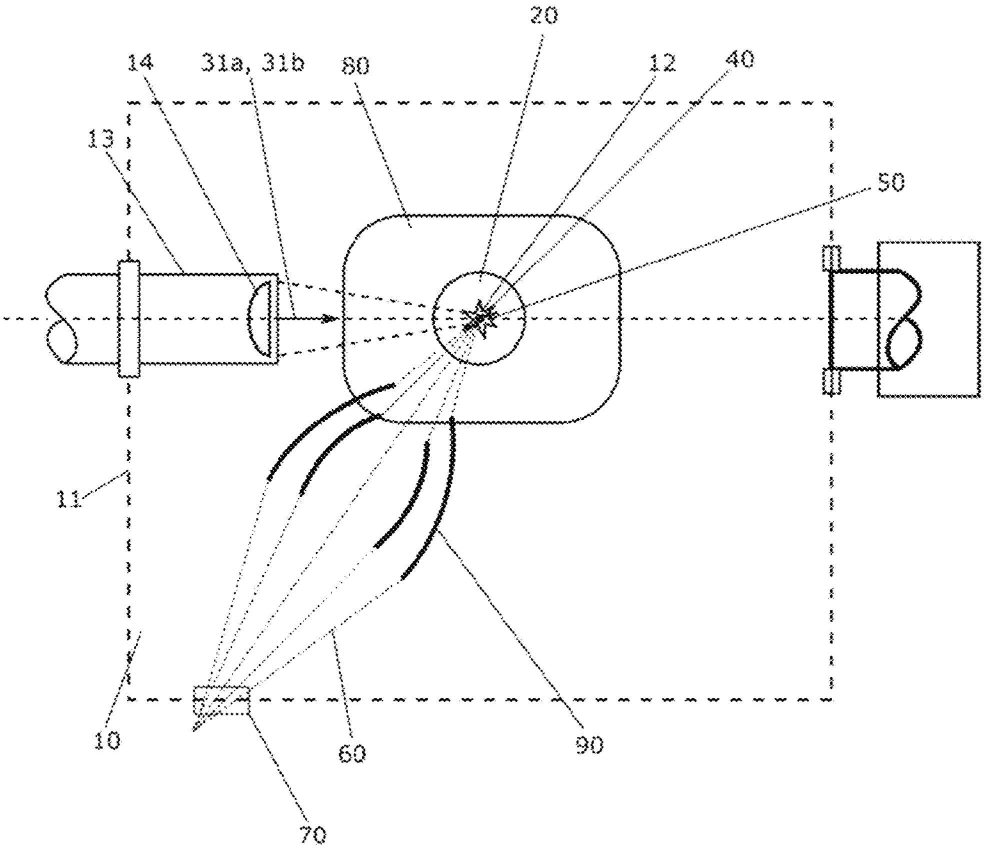
FIG. 4 schematically shows a simplified top view of a fourth embodiment of a device for generating electromagnetic radiation according to the present invention comprising a grazing incidence collector.

In the embodiment shown in FIG. 4, the collector 90 is arranged according to a grazing incidence collector setup having an intermediate focus 70. Grazing incidence collectors rely on small incidence angles, in particular in order to reflect soft or hard-X-ray radiation, and use single mirror surfaces. Typically, nested arrangements are used to increase the power output.

In particular, the devices shown in FIGS. 3 and 4 may include any of the components depicted in FIG. 1-2.

Any type of laser source 30 may be used for the device 1 according to the invention, for example an Nd:YAG laser emitting at 1064 nm, a $CO_2$ laser emitting at 9.4 μm and 10.6 μm, a pulsed diode laser, a fiber laser, a solid state laser or a gas laser.

The laser source 30 must be able to generate a main laser pulse 34 with an energy (intensity) high enough to ionize the target material of choice in order to generate a radiating plasma. A typical laser energy (intensity) of the main laser pulse is up to 300 mJ. However, other suitable laser energies may also be used.

In the device 1 shown in FIG. 1, a single laser source 30 is used for generating both the main laser beam for converting the target 40 to a radiating plasma 50 as well as for conditioning the target 40 by means of a pre and/or post pulse sequence 32, as explained below.

The laser source 30 is adapted to generate a laser beam 31 which is focused by a lens 14 arranged in beam directing and focusing optics 13.

The device 1 according to the embodiment shown in FIG. 1 is configured such that in addition to the main laser pulse 34, at least one pulse sequence 32 comprising a plurality of conditioning laser pulses 33 can be generated by the laser source 30, wherein subsequent conditioning laser pulses 33 are separated by time intervals t1 of 200 ns or less.

Since the target 40 is moving along the third axis A3 while the at least one pulse sequence 32 and the main laser pulse 34 is directed to the target 40, the at least one pulse sequence 32 and the main laser pulse 34 may irradiate different locations that the target aligns with at the time of the pulse sequence 32 and the main laser pulse 34 depending on the timing, the spot diameters of the respective laser beams 31, 31*a*, 31*b* and the size of the target 40.

A typical laser pulse energy of a single conditioning pulse is about 1 μJ to 2 mJ, wherein the total sequence energy may be about 20 μJ to 3 mJ depending upon the laser parameters and the size and/or material of the targets 40.

For instance, the at least one pulse sequence 32 may be generated by different pulse-generating devices. As an example, an electro-optic modulator (EOM) 37 for periodically changing the intensity of the laser source 30 in order to generate the at least one pulse sequence 32 is depicted in FIG. 1. Alternatively, for example an acousto-optic modulator (AOM) 38 may also be used to change the intensity of the laser source 30. Therein, the EOM 37 or AOM 38 periodically changes the intensity of the generated laser light by means of electric or acoustic signals applied to the respective modulator, such that a pulse sequence 32 is generated.

In an EOM 37, a material with a refractive index, which is a function of its local electric field, such as certain crystals or organic polymers, is subjected to an electric field. This material is positioned in the light path of the laser beam, and an electric signal is applied to periodically change the refractive index, and thus the resulting light intensity.

A typical AOM 38 comprises a quartz crystal and a piezo-electric transducer configured to generate sound waves in the quartz crystal, thereby changing the index of refraction in the quartz crystal. To modulate the intensity of the laser light, the quartz crystal is positioned in the light path of the laser beam, and sound waves are generated in the quartz crystal to influence Alternatively, a mode-locked laser oscillator 39, particularly a Q-switched mode-locked laser oscillator may be used in the laser source 30 to generate the pulse sequence 32. Such a laser oscillator can generate pulse sequences with pulse durations in the picosecond range. Using such lasers, a sequence duration of several microseconds, for example 100 ns to 2 μs may be achieved.

Of course, other suitable methods known to the skilled person may be used for generating pulse sequences 32 according to the invention.

FIG. 1 further shows a synchronization unit 310 for controlling the timing of the at least one pulse sequence 32 and the main laser pulse 34. This may be achieved by controlling the EOM 37 (as illustrated in FIG. 1) or AOM 38.

After generating the at least one pulse sequence 32, the at least one pulse sequence 32 may be amplified (that is increased in energy/laser intensity) by means of an amplifier stage or several amplifier stages. This is particularly advantageous if an EOM 37 or AOM 38 is used for generating the pulse sequence 32, since laser intensity is lost during modulation by the EOM 37 or AOM 38 in this case. In this manner, a defined time delay t3 between the laser pulse sequence 32 and the main laser pulse 34 can be achieved.

In addition to generating the pulse sequence 32, the laser source 30 of the device 1 is also configured to generate a main laser pulse 34 for ionizing the target 40 and generating the radiating plasma 50.

The device 1 according to the embodiment shown in FIG. 1 may comprise a synchronization unit 310 adapted to control the laser source 30, such that a defined time delay t3 between the at least one laser pulse sequence 32 and the main laser pulse 34 is achieved.

FIG. 2 shows a second embodiment of the device 1 for generating radiation according to the invention, wherein two separate laser sources, namely a conditioning laser source 35 for generating at least one pulse sequence 32 and a main laser source 36 for generating a main laser pulse 34 are provided. The conditioning laser source 35 and the main laser source 36 are arranged such that both a conditioning laser beam 31*a* generated by the conditioning laser source 35 and a main laser beam 31*b* generated by the main laser source 36 may be focused by a single lens 14 arranged in beam directing and focusing optics 13. For example the conditioning laser beam 31*a* and the main laser beam 31*b* (which are depicted along the first axis A1 for simplicity) may be parallel or essentially parallel to each other, but offset along the third axis A3.

Alternatively, the conditioning laser beam 31*a* and the main laser beam 31*b* may be arranged at an angle. It is also possible that the conditioning laser beam 31*a* and the main laser beam 31*b* are parallel to each other along the light path from the conditioning laser source 35 to the lens 14 and from the main laser source 36 to the lens 14, but due to their offset along the third axis A3 are focused by the lens 14 such that the conditioning laser beam 31*a* and the main laser beam 31*b* are arranged at an angle along the light path from the lens 14 to the target 40. Apart from the separate laser sources 35, 36, this embodiment of the device 1 is identical to the embodiment shown in FIG. 1 and described above.

The main laser beam 31*b* is provided along the first axis A1, and the conditioning laser beam 31*a* is provided along a second axis A2, wherein the first axis A1 is non-parallel to the second axis A2, and the first axis A1 and the second axis A2 intersect at the irradiation site 12.

As an example, an acousto optical modulator (AOM) 38 is shown in FIG. 2 as a means to change the intensity of the conditioning laser source 35 in order to generate the pulse sequence 32. Of course, it is also possible to apply an electro optical modulator (EOM) 37 instead of the AOM 38 or the conditioning laser source 35 may be a mode-locked laser oscillator 39. Furthermore, a synchronization unit 310, which is adapted to synchronize the timing of the pulse sequence 32 and the main laser pulse 34 by controlling the AOM 38 and the main laser source 36 is shown. By means of the synchronization unit 310, a defined time delay t3 between the laser pulse sequence 32 and the main laser pulse 34 may be achieved.

FIG. 3 shows a top view (turned by 90° compared to the view shown in FIGS. 1 and 2) of a third embodiment of the device 1 for generating radiation according to the invention, comprising a conditioning laser source 35 for generating a pulse sequence 32 and a separate main laser source 36 for generating the main laser pulse 34. Therein, the device 1 comprises two separate beam directing and focusing optics 13 each comprising a respective lens 14 arranged in the respective beam directing and focusing optics 13, wherein the beam directing and focusing optics 13 are arranged at an angle. Apart from the separate laser sources 35, 36, beam directing and focusing optics 13 and collector 90, this embodiment of the device 1 is identical to the embodiment shown in FIG. 1 and described above.

The embodiment depicted in FIG. 3 is shown with a normal incidence collector 90. Of course, a setup with separate conditioning laser source 35 and main laser source 36 may also be combined with a grazing incidence collector (see FIG. 4) or a center axis collector (see FIGS. 1 and 2).

The main laser source 36 is configured to generate a main laser beam 31*b* along the first axis A1, and the conditioning laser source 35 is configured to generate a conditioning laser beam 31*a* along a second axis A2, wherein the first axis A1 is non-parallel to the second axis A2. The conditioning laser beam 31*a* and the main laser beam 31*b* are focused by the respective lens 14 of the respective beam directing and focusing optics 13.

For example, in order to generate a pulse sequence 32 using the device shown in FIGS. 2 and 3, the conditioning laser source 35 may comprise or consist of a mode-locked laser oscillator 39, as shown in FIG. 3. The device 1 shown in FIG. 3 further comprises a synchronization unit 310 for controlling the conditioning laser source 35 and the main laser source 36, such that a defined time delay t3 between the laser pulse sequence 32 and the main laser pulse 34 is achieved. Of course, other means for changing the intensity of the conditioning laser source 35, such as an EOM 37 (see FIG. 1) or an AOM 38 (see FIG. 2) may be used with the device 1 shown in FIG. 3.

Additionally, the device 1 according to the embodiments shown in FIGS. 2 and 3 may comprise a synchronization unit 310 adapted to synchronize the conditioning laser source 35 and the main laser source 36, such that a defined time delay t3 between the laser pulse sequence 32 and the main laser pulse 34 is achieved.

Figure 5:
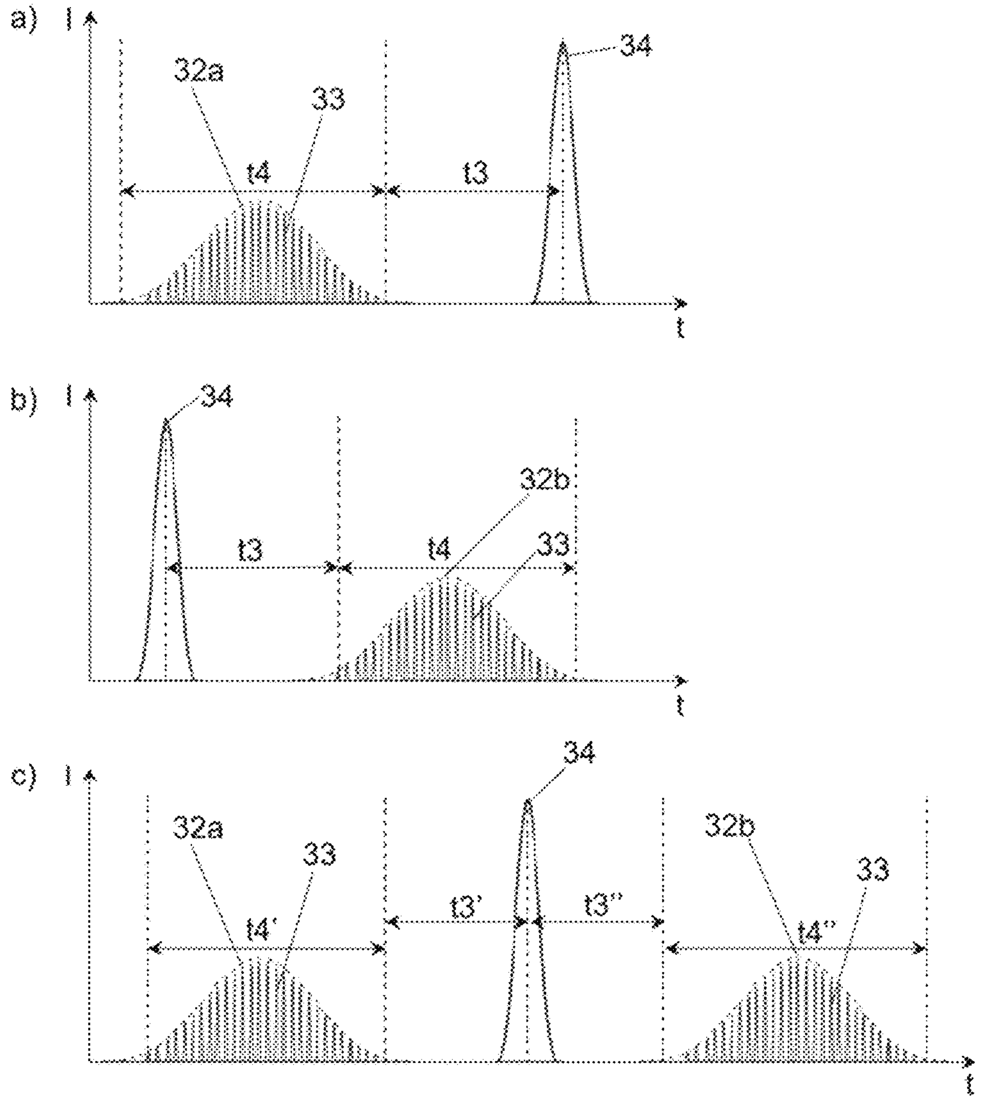
FIG. 5 shows time vs. intensity plots elucidating examples of the method according to the present invention.

FIG. 5 shows time t vs. laser intensity I diagrams, elucidating different embodiments of the method according to the invention.

According to a first embodiment of the method (FIG. 5*a*) a pre pulse sequence 32*a* comprising a plurality of conditioning pulses 33 and having a sequence duration t4, for example 0.1 μs to 4 μs, is directed to the target 40 (see FIGS. 1 to 4) prior to a main laser pulse 34, wherein the pre pulse sequence 32*a* is separated from the main laser pulse 34 by a time delay t3, for example 0.1 μs to 10 μs.

In contrast, a post pulse sequence 32*b* is directed to the target 40 after the main laser pulse 34 according to the second embodiment (FIG. 5*b*). The post pulse sequence 32*b* comprises a plurality of conditioning laser pulses 33 and has a sequence duration t4 for example 0.1 μs to 4 μs. Furthermore, the post pulse sequence 32*b* is administered after a time delay t3, for example 0.5 μs to 10 μs, after the main laser pulse 34.

FIG. 5*c* shows an example of the method, wherein both a pre pulse sequence 32*a* and a post pulse sequence 32*b* are provided, wherein both the pre pulse sequence 32*a* and the post pulse sequence 32*b* comprise a respective plurality of conditioning laser pulses 33. The pre pulse sequence 32*a* has a sequence duration t4' and the post pulse sequence 32*b* has a sequence duration t4", wherein the respective sequence durations t4',t4" may be similar to the embodiments shown in FIGS. 5*a* and 5*b* and described above. The main laser pulse 34 is provided at a time delay t3' after the pre pulse sequence 32*a*, and the post pulse sequence 32*b* is provided at a time delay t3" after the main laser pulse 34.

Figure 6:
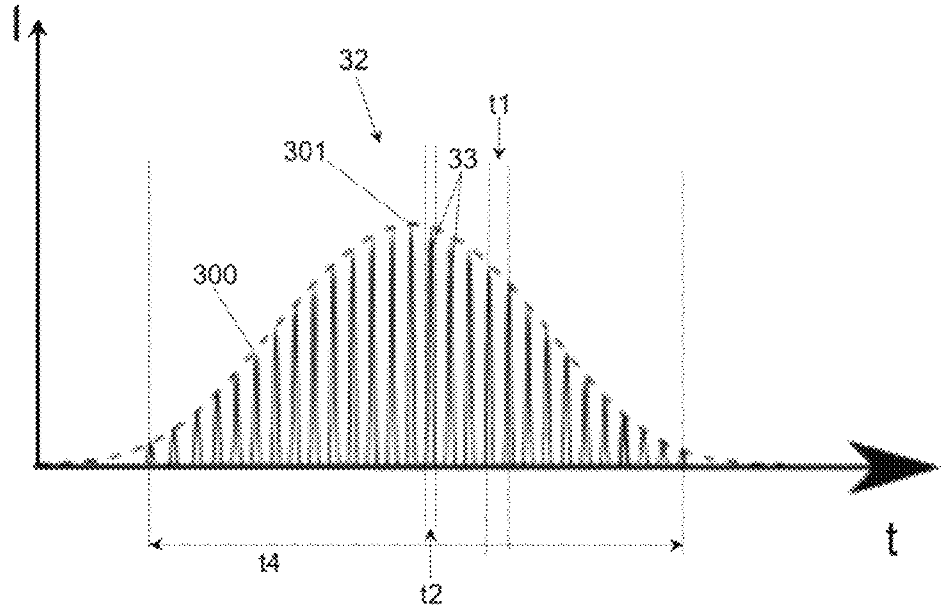
FIG. 6 shows an example of a pulse sequence according to the invention.

FIG. 6 is a time coordinate t vs. laser intensity I plot showing an exemplary (pre or post) pulse sequence 32 in detail. The pulse sequence 32 comprises a plurality of conditioning laser pulses 33, each having a pulse duration t2 in the picosecond range. Subsequent individual conditioning laser pulses 33 are separated on the time scale by time intervals t1 of 200 ns or less. Furthermore, the pulse sequence 32 comprises a total sequence duration t4.

Additionally, an envelope 300 of the pulse sequence 32 is depicted by a dashed line, wherein the envelope 300 is a curve touching a plurality of maxima of the individual conditioning laser pulses 33. In the example depicted in FIG. 6, the envelope 300 comprises a single peak 301, in other words a maximum of the curve constituting the envelope 300. The envelope 300 may resemble a Gaussian or Lorentzian curve in certain cases, but the invention is not restricted to such cases.

Figure 7:
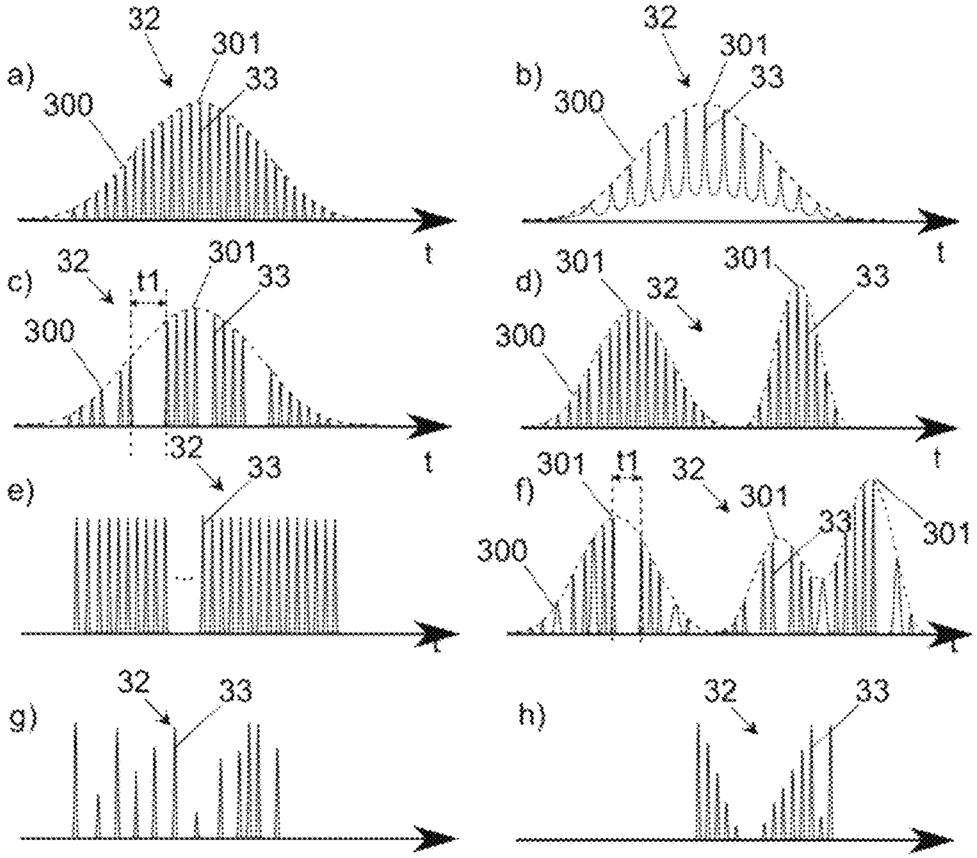
FIG. 7 shows further examples of pulse sequences according to the invention.

FIG. 7 depicts further examples of pulse sequences 32 according to the invention as time t vs. laser intensity I plots. The pulse sequence 32 shown in FIG. 7*a* is identical to the one shown in FIG. 6 and described above.

FIG. 7*b* shows a pulse sequence 32, which may be particularly generated by means of a Q-switched mode-locked oscillator laser. The conditioning laser pulses 33 resemble the internal picosecond-range oscillations of the 10-ns-pulses generated by the oscillator. As shown in FIG. 7*b*, the conditioning laser pulses 33 overlap on the time scale. Similar to the profile shown in FIG. 7*a*, the envelope 300 of the pulse sequence 32 has a single peak 301.

FIG. 7*c* shows a pulse sequence 32 resembling the pulse sequence 32 shown in FIG. 7*a*, wherein certain time intervals t1 between subsequent conditioning laser pulses 33 are longer than in the pulse sequence 32 shown in FIG. 7*a*.

In FIG. 7*d*, a further pulse sequence 32 comprising an envelope 300 with two peaks 301 is shown.

FIG. 7*e* shows a pulse sequence 32 comprising a plurality of conditioning laser pulses 33 of identical laser intensity and identical pulse duration t2.

FIG. 7*f* depicts a pulse sequence 32 comprising an envelope 300 with three peaks 301 and certain longer time intervals t1 compared to the profile shown in FIG. 7*a*. In addition, the conditioning laser pulses 33 comprise different pulse durations t2.

Finally, FIGS. 7*g* and 7*h* show further pulse sequences 32 having no envelope function with a single peak.

The parameters such as time interval t1, number and/or energy of pulses in a pulse sequence, and pulse duration t2 may be varied widely within the scope of the invention to achieve shaping of the target 40.

Figure 8:
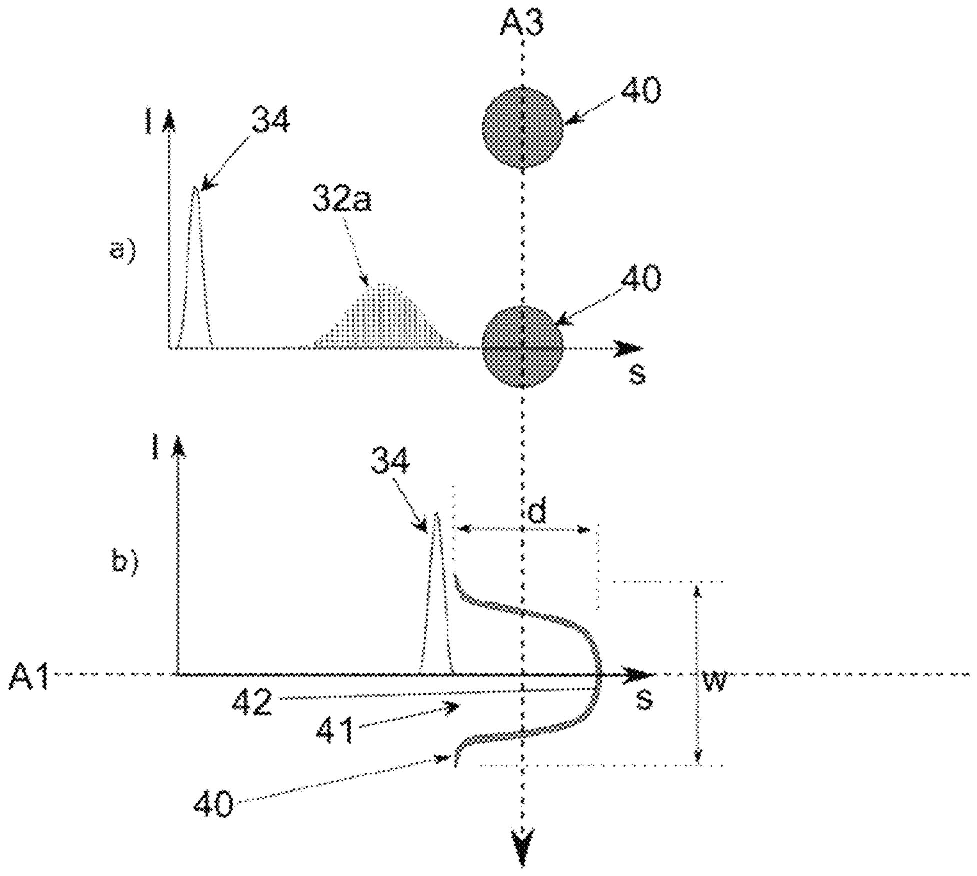
FIG. 8 shows an example of the method according to the invention, wherein the shape of a target is altered by a pre pulse sequence.

FIG. 8 shows an example of the effect of a pre pulse sequence 32*a* on the shape of the target 40. FIG. 8*a* depicts the situation before the conditioning laser pulses 33 in the pre pulse sequence 32*a* affect the target 40. The target 40 is traveling along the third axis A3 in the vacuum chamber 10 (see FIGS. 1 and 2).

In contrast to the plots shown in FIG. 5 to FIG. 7, the x-axis of the plot shown in FIG. 8*a* represents the spatial coordinate s along the first axis A1 assuming that the pre pulse sequence 32*a* is administered along the same axis as the main laser pulse 34 (see FIG. 1).

FIG. 8*b* shows the situation after the conditioning laser pulses 33 of the pre pulse sequence 32 have hit the target 40 and before the main laser pulse 34 has hit the target 40, which is shown in cross-section. By means of the conditioning laser pulses 33, the shape of the target 40 has been changed. In particular, the target 40, which initially comprised a spherical shape (FIG. 8*a*) has been expanded to a cup shape comprising a width W perpendicular to the first axis A1 (which is the same as along the third axis A3 in the case depicted here). The cup-shaped target 40 comprises a cavity 41 comprising a depth d along the first axis A1. The cavity 41 further comprises an inside surface 42. Of course, the effect shown in FIG. 8*b* can also be achieved with the setup shown in FIG. 3, where the pre pulse sequence 32*a* can be provided off-axis in respect of the main laser pulse 34.

In particular, both the sequence duration t4 and the shape (envelope 300, intervals t1, pulse duration t2, laser intensities of conditioning laser pulses 33) of the pre pulse sequence 32 influence the shape of the deformed target 40.

Due to the relatively thin film of target material in the expanded target 40 (FIG. 8*b*), smaller debris particles 43 are formed from the target material after the plasma 50 has been generated. These smaller debris particles 43 are easier to deflect, thereby improving the protection of optics of the device 1 from the debris.

When the main laser pulse 34 hits the inside surface 42 of the cavity 41, the conversion efficiency of the target material is also advantageously improved by the depicted cup shape of the target 40.

Furthermore, without wishing to be bound by theory, it is assumed that the pre pulse sequence 32 according to the invention leads to an especially continuous surface of the expanded target material, particularly resulting in less cavitation bubbles which reduces instability during target 40 expansion after the main laser pulse 34 hits the target 40.

Figure 9:
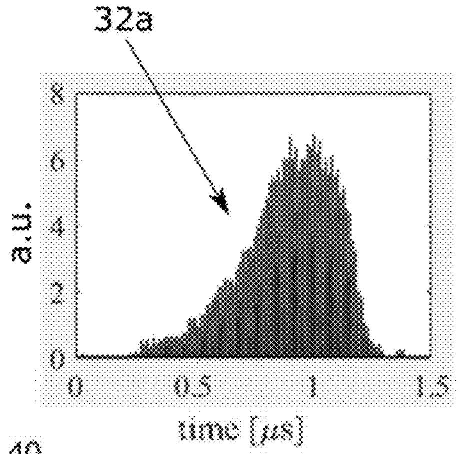
FIG. 9 shows a first example of a pre pulse sequence according to the invention and the resulting target shape.
Figure 9:
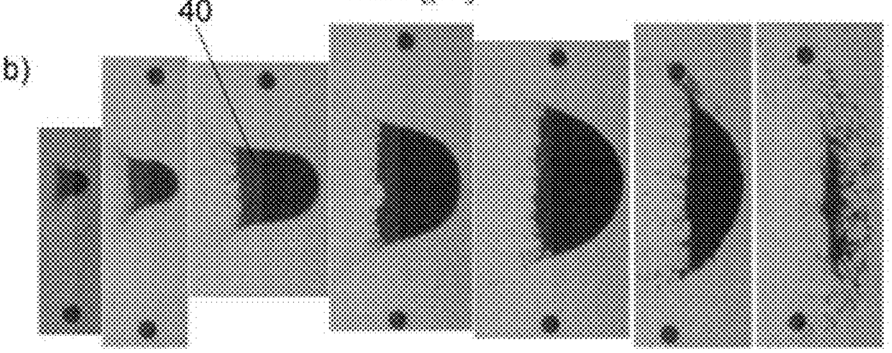
Figure 10:
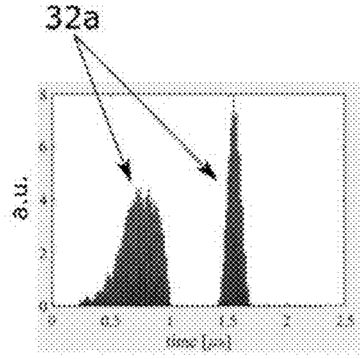
FIG. 10 shows a second example of a pre pulse sequence according to the invention and the resulting target shape.
Figure 10:
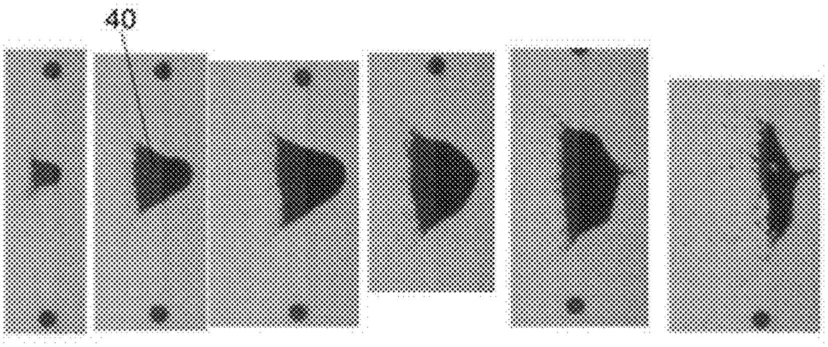

FIG. 9 and FIG. 10 show examples of pre pulse sequences 32*a* according to the invention (FIGS. 9*a* and 10*a*) along with shadowgraph pictures of the respective target shape generated by the respective pre pulse 32 at successive times from the pre pulse sequence 32*a* (FIGS. 9*b* and 10*b*). In each case the laser irradiated the target 40 from the left side.

The pre pulse sequence 32*a* shown in FIG. 9*a* resulted in a cup shaped target 40 comprising a cavity (FIG. 9*b*) similar to the one shown in FIG. 8*b*. The pre pulse sequence 32*a* depicted in FIG. 9*a* comprised a sequence with a time interval of 12.5 ns.

In contrast, the two subsequent pre pulse sequences 32*a* illustrated in FIG. 10*a* comprising a time interval of 12.5 ns generated a cone or umbrella shaped target 40 comprising a cavity 41 (FIG. 10*b*).

It is intended in both cases that the main laser pulse 34 enters the respective cavity 41 from the left side.

Figure 11:
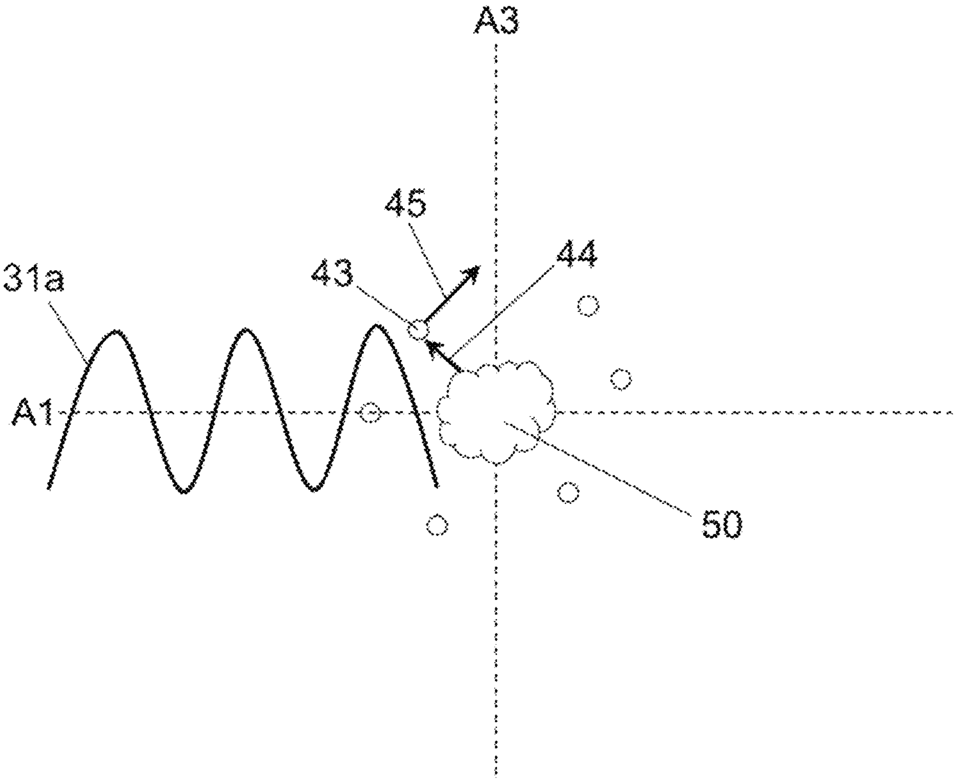
FIG. 11 shows an example of the method according to the invention, wherein debris particles are deflected by a post pulse sequence.

FIG. 11 schematically depicts certain effects of the post pulse sequence 32*b* according to the invention. The situation shortly after the main laser pulse 34 has hit the target 40 is shown. The target 40 has been partially converted to a plasma 50, wherein debris particles 43 of non-converted target material are propelled from the plasma 50. The initial direction of movement 44 of an exemplary debris particle 43 is depicted by an arrow.

The post pulse sequence 32*b* administered after the main laser pulse 34 has partially converted the target 40 to the plasma 50 deflects the debris particles 43 from their initial direction of movement 44 to a new direction of movement 45, thereby protecting optics of the device 1 from the debris.

Figure 12:
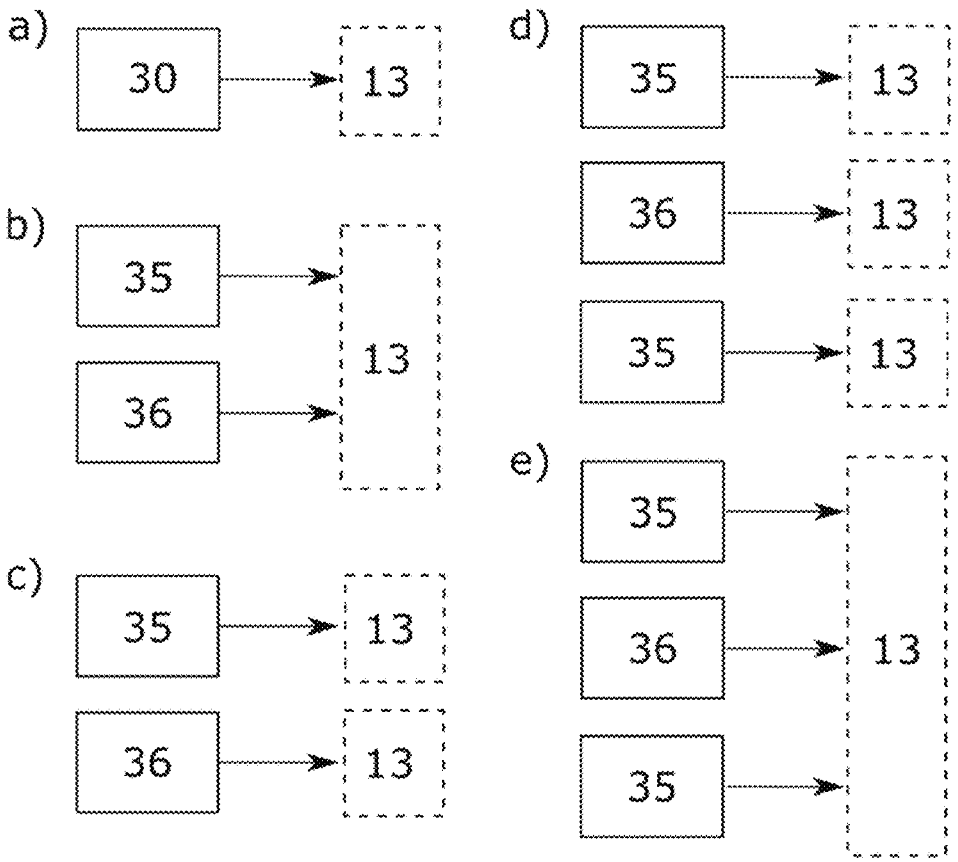
FIG. 12 shows a schematic flow chart illustrating different setups of laser illumination in a device according to the invention.

FIG. 12*a* is a general schematic illustration of a laser illumination setup such as the one used in the device 1 according to FIG. 1. The laser beam of a single laser source 30, which may be modulated in intensity by an AOM, EOM or a Q-switched mode-locked laser oscillator is directed and focused by beam directing and focusing optics 13.

FIG. 12*b* is a general schematic illustration of a laser illumination setup such as the one used in the device 1 according to FIG. 2. The laser beams of a conditioning laser source 35, which may be modulated in intensity by an AOM, EOM or a Q-switched mode-locked laser oscillator, and a main laser source 36 is directed and focused by a single beam directing and focusing optics 13.

According to FIG. 12*c*, the laser beams of a conditioning laser source 35 and a main laser source 36 are directed and focused by separate beam directing and focusing optics 13. To this end, a setup such as the one depicted in FIG. 3 may be used.

FIG. 12*d* and FIG. 12*e* show setups comprising two conditioning laser sources 35, for example to respectively generate a pre pulse sequence and a post pulse sequence and a main laser source 36. According to FIG. 12*d*, the conditioning laser beams of the conditioning laser sources 35 and the main laser beam of the main laser source 36 are respectively directed and focused by three separate beam directing and focusing optics 13. In contrast, the setup shown in FIG. 10*e* shows a single beam directing and focusing optics 13 for directing and focusing the beams of both conditioning lasers sources 35 and the main laser source 36.

LIST OF REFERENCE NUMERALS

Device 1
Vacuum chamber 10
Casing 11
Irradiation site 12
Lens 14
Beam directing and focusing optics 13
Positioning system 15
Dispensing device 20
Laser source 30
Laser beam 31
Conditioning laser beam 31a
Main laser beam 31b
Pulse sequence 32
Pre pulse sequence 32a
Post pulse sequence 32b
Conditioning laser pulse 33
Main laser pulse 34
Conditioning laser source 35
Main laser source 36
Electro-optic modulator 37
Acousto-optic modulator 38
Mode-locked laser oscillator 39
Target 40
Cavity 41
Inside surface 42
Debris particle 43
Initial direction of movement 44
New direction of movement 45
Plasma 50
Radiation 60
Intermediate focus 70
Reservoir 80
Collector 90
Envelope 300
Peak 301
Synchronization unit 310
First axis A1
Second axis A2
Third axis A3
Time interval t1
Pulse duration t2
Time delay t3, t3', t3"
Sequence duration t4, t4', t4"
Depth d
Width w
Time coordinate t
Spatial coordinate s
Laser intensity l

The invention claimed is:

1. A method for generating electromagnetic radiation by means of a laser-produced plasma, wherein a target (40) comprising a target material is provided, at least one pulse sequence (32) is directed to said target (40), wherein said pulse sequence (32) comprises at least three conditioning laser pulses (33), wherein time intervals (t1) between subsequent conditioning laser pulses (33) are 200 ns or less, a main laser pulse (34) is directed to said target (40) along a first axis (A1), such that a radiation-emitting plasma (50) is formed from at least a part of said target material; and wherein said pulse sequence (32) comprises at least 10 conditioning laser pulses (33).

2. The method according to claim 1, wherein said time intervals (t1) between subsequent conditioning laser pulses (33) are 100 ns or less.

3. The method according to claim 1, wherein each of said conditioning laser pulses (33) comprises a pulse duration (t2) of 999 ps or less.

4. The method according to claim 1, wherein a time delay (t3) between said pulse sequence (32) and said main laser pulse (34) is 10 μs or less.

5. The method according to claim 1, wherein said pulse sequence (32) comprises a sequence duration (t4) of at least 0.1 μs.

6. The method according to claim 1, wherein said pulse sequence (32) comprises an envelope (300) comprising at least one peak (301).

7. The method according to claim 1, wherein said pulse sequence (32) comprises an envelope (300) comprising at least two peaks (301), wherein said peaks (301) partially overlap on a time scale.

8. The method according to claim 1, wherein said pulse sequence (32) comprises at least two different time intervals (t1) between subsequent conditioning laser pulses (33).

9. The method according to claim 1, wherein said at least one pulse sequence (32) comprises at least one pre pulse sequence (32*a*) which is directed to said target (40) prior to said main laser pulse (33).

10. The method according to claim 9, wherein the shape of said target (40) is changed by means of said at least one pre pulse sequence (32*a*), such that said target (40) is expanded along said first axis (A1) and/or perpendicular to said first axis (A1).

11. The method according to claim 9, wherein a cavity (41) is created in said target (40) by means of said at least one pre pulse sequence (32*a*), wherein said main laser pulse (34) is directed to an inside surface (42) of said cavity (41).

12. A method for generating electromagnetic radiation by means of a laser-produced plasma, wherein a target (40) comprising a target material is provided, at least one pulse sequence (32) is directed to said target (40), wherein said pulse sequence (32) comprises at least three conditioning laser pulses (33), wherein time intervals (t1) between subsequent conditioning laser pulses (33) are 200 ns or less, a main laser pulse (34) is directed to said target (40) along a first axis (A1), such that a radiation-emitting plasma (50) is formed from at least a part of said target material;

wherein said at least one pulse sequence (32) comprises at least one pre pulse sequence (32*a*) which is directed to said target (40) prior to said main laser pulse (33);

wherein a cavity (41 is created in said target (40) by means of said at least one pre pulse sequence (32*a*), wherein said main laser pulse (34) is directed to an inside surface (42) of said cavity (41); and wherein said cavity (41) comprises a depth (d) along said first axis (A1) and a width (w) perpendicular to said first axis (A1), wherein the ratio between said depth (d) and said width (w) is from 100:1 to 1:100.

13. The method according to claim 1, wherein said at least one pulse sequence (32) comprises at least one post pulse sequence (32*b*) which is directed to said target (40) after said main laser pulse (34).

14. The method according to claim 13, wherein at least a part of said target material, or at least one debris particle (43) generated from said target material by means of said plasma (50), is deflected by means of said at least one post pulse sequence (32*b*).

15. The method according to claim 1, wherein said at least one pulse sequence (32) comprises at least one pre pulse sequence (32*a*) comprising at least three conditioning laser pulses (33) and at least one post pulse sequence (32*b*) comprising at least three conditioning laser pulses (33), wherein time intervals (t1) between subsequent conditioning laser pulses (33) within said at least one pre pulse sequence (32*a*) and within said at least one post pulse sequence (32*b*) are 200 ns or less, wherein said at least one pre pulse sequence (32*a*) is directed to said target (40) prior to said main laser pulse (34), and wherein said at least one post pulse sequence (32*b*) is directed to said target (40) after said main laser pulse (34).

16. A device (1) for generating electromagnetic radiation by means of a laser-produced plasma, by the method according to claim 1, wherein the device (1) comprises a dispensing device (20) for providing a target (40) comprising a target material, at least one laser source (30), wherein said device (1) is configured such that at least one pulse sequence (32) comprising at least three conditioning laser pulses (33) and a main laser pulse (34) can be generated by the at least one laser source (30), wherein time intervals (t1) between subsequent conditioning laser pulses (33) are 200 ns or less, and wherein said dispensing device (20) and said at least one laser source (30) are arranged such that said at least one pulse sequence (32) can be directed to said target (40), and said main laser pulse (34) can be directed to said target (40) along a first axis (A1), such that a radiation-emitting plasma (50) is formed from at least a part of said target material.

17. The device according to claim 16, wherein said at least one laser source (30) comprises a conditioning laser source (35) for generating said conditioning laser pulses (33) and a main laser source (36) for generating said main laser pulse (34).

18. The device according to claim 16, wherein said at least one laser source (30) comprises an electro-optic modulator (37) or an acousto-optic modulator (38) for changing the laser intensity of said at least one laser source (30), such that said at least one pulse sequence (32) can be generated.

19. The device according to claim 16, wherein said at least one laser source (30) comprises a mode-locked laser oscillator (39), or a Q-switched mode-locked laser oscillator, for generating said at least one pulse sequence (32).

* * * * *